(12) United States Patent
Serizawa

(10) Patent No.: US 7,443,556 B2
(45) Date of Patent: Oct. 28, 2008

(54) OPTICAL SCANNING APPARATUS AND IMAGE FORMING APPARATUS

(75) Inventor: Keiichi Serizawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 81 days.

(21) Appl. No.: 11/275,983

(22) Filed: Feb. 8, 2006

(65) Prior Publication Data
US 2006/0209375 A1 Sep. 21, 2006

(30) Foreign Application Priority Data
Mar. 17, 2005 (JP) .............................. 2005-078248

(51) Int. Cl.
*G02B 26/08* (2006.01)
(52) U.S. Cl. ...................................... 359/205; 359/204
(58) Field of Classification Search ........................ None
See application file for complete search history.

(56) References Cited

U.S. PATENT DOCUMENTS

2004/0125193 A1 * 7/2004 Kubo ........................... 347/233
2004/0179087 A1 * 9/2004 Yoshizawa et al. ............. 347/232
2005/0190420 A1 * 9/2005 Imai et al. ..................... 359/210
2006/0132880 A1 * 6/2006 Amada et al. ................. 359/196

FOREIGN PATENT DOCUMENTS

| JP | 11-287966 | 10/1999 |
|---|---|---|
| JP | 2001-100135 | 4/2001 |
| JP | 2002-182145 | 6/2002 |

* cited by examiner

*Primary Examiner*—James Phan
(74) *Attorney, Agent, or Firm*—Oblon, Spivak, McClelland, Maier & Neustadt, P.C.

(57) ABSTRACT

In an optical scanning apparatus, an optical element has power for predominantly correcting a position of a scanning line by scanning in a sub-scanning direction; a scanning line curvature adjusting unit adjusts a curvature of the scanning line by deforming the optical element in the sub-scanning direction; a scanning line inclination adjusting unit adjusts an inclination of the scanning line by rotating the scanning line about an axis that is at right angles to a main scanning direction and the sub-scanning direction; and one automatic actuating unit each provided in the scanning line curvature adjusting unit, and the scanning line inclination adjusting unit.

6 Claims, 7 Drawing Sheets

OPTICAL SCANNING APPARATUS AND IMAGE FORMING APPARATUS

CROSS-REFERENCE TO RELATED APPLICATIONS

The present document incorporates by reference the entire contents of Japanese priority document, 2005-078248 filed in Japan on Mar. 17, 2005.

BACKGROUND OF THE INVENTION

1. Field of the Invention

The present invention relates to a technology for adjusting curvature and inclination of the scanning lens in an optical scanning apparatus and an image forming apparatus.

2. Description of the Related Art

An image forming apparatus employed in a laser beam printer, digital copier, or laser facsimile machine includes a regular polygon mirror that performs deflective scanning of a light beam emitted by a light source, and an optical element (scanning lens) that images the light beam scanned by the polygon mirror on a photosensitive member. Additionally, the image forming apparatus includes a photodetector that determines the starting point of recording. The photodetector is provided on the side where scanning starts, outside an effective exposure area.

In such a color image forming apparatus, a laser beam scanning line curves/inclines depending on curvature characteristics of the optical element, skew of the optical housing, heat distortion of a motor driving the polygon mirror, heat distortion within the main unit due to heat for another unit, skew in the photosensitive member, etc. Due to the curvature/inclination in the scanning line, three or four scanning lines fail to merge, resulting in color shift.

To counter this problem, Japanese Patent Laid-Open Publication No. H11-287966 discloses a technology in which a plate-shaped glass is provided inside the optical housing along the scanning direction. The curvature/inclination of the scanning line can be adjusted by placing the glass in the housing tilted in cross-sectional view or by changing the thickness of the glass.

However, even though the amount of curvature of the scanning line can be adjusted by this conventional technology, the inclination of the scanning line cannot be adjusted. Therefore, the inability to adjust the inclination of the scanning line leads to degradation of image quality due to unevenness of color, color shift, and the like. Further, inserting the glass in the housing degrades the optical characteristics by causing wavefront aberration, etc.

Japanese Patent Laid-Open Publication No. 2001-100135 discloses a technology in which the inclination of the scanning line is adjusted by inclining a folded mirror in the optical housing perpendicular to the optical axis.

However, in this conventional technology, even though the inclination of the scanning line can be adjusted, adjustment of the inclination results in variation of the curvature of the scanning line, necessitating further readjustments and making it difficult to meet the correction values. Further, after correction of the curvature/inclination of the scanning line, the magnification of each toner image varies (the light path length from each toner image varies because of the spinning of the folded mirror).

To correct the varying magnification of the different toner images, a technology is disclosed in Japanese Patent Laid-Open Publication No. 2002-182145, in which a mechanism for adjusting the curvature/inclination of the scanning line is provided in a long lens corresponding to each semiconductor laser.

However, the conventional technology disclosed in Japanese Patent Laid-Open Publication No. 2002-182145 described above present the following problem.

Though the mechanism provided for adjusting the curvature/inclination of the scanning line takes care of the problem faced in the earlier conventional technology, the mechanism itself takes up a large space and is difficult to be placed inside the optical housing. In addition, the mechanism pushes up the cost significantly.

SUMMARY OF THE INVENTION

It is an object of the present invention to at least solve the problems in the conventional technology.

According to an aspect of the present invention, an optical scanning apparatus includes an optical housing having a first surface and a second surface facing one another, where the first surface bears an optical element having power for predominantly correcting a position of a scanning line by scanning in a sub-scanning direction; a scanning line curvature adjusting unit that adjusts a curvature of the scanning line by deforming the optical element in the sub-scanning direction; a scanning line inclination adjusting unit that adjusts an inclination of the scanning line by rotating the scanning line about an axis that is at right angles to a main scanning direction and the sub-scanning direction; and a first actuating unit provided in the scanning line curvature adjusting unit, and a second actuating unit provided in the scanning line inclination adjusting unit, the first actuating unit and the second actuating unit being auto-driven; where the optical element is directly borne on the first surface, and the scanning line curvature adjusting unit and the scanning line inclination adjusting unit are provided on the second surface.

According to another aspect of the present invention, in an image forming apparatus of a single-drum type or a tandem color type, an optical scanning apparatus includes an optical housing having a first surface and a second surface facing one another, where the first surface bears an optical element having power for predominantly correcting a position of a scanning line by scanning in a sub-scanning direction; a scanning line curvature adjusting unit that adjusts a curvature of the scanning line by deforming the optical element in the sub-scanning direction; a scanning line inclination adjusting unit that adjusts an inclination of the scanning line by rotating the scanning line about an axis that is at right angles to a main scanning direction and the sub-scanning direction; and a first actuating unit provided in the scanning line curvature adjusting unit, and a second actuating unit provided in the scanning line inclination adjusting unit, the first actuating unit and the second actuating unit being auto-driven; where the optical element is directly borne on the first surface, and the scanning line curvature adjusting unit and the scanning line inclination adjusting unit are provided on the second surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained next with reference to the accompanying drawings.

Figure 1:
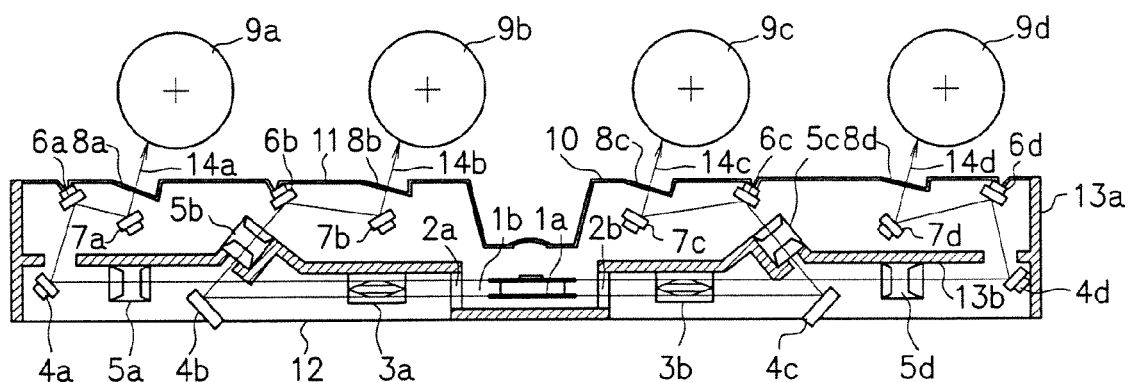
FIG. 1 is a schematic of a digital color writing system according to the present invention.

FIG. 1 is a schematic of a digital color writing system according to the present invention. The digital color writer system includes polygon mirrors 1a and 1b, sound-damping glasses 2a and 2b, fθ lenses 3a and 3b, first mirrors 4a through 4d, second mirrors 6a through 6d, third mirrors 7a through 7d, long lenses 5a through 5d, dust protection glasses 8a through 8d, photosensitive members 9a through 9d on which images are formed, an optical housing 15 that includes 13a (side walls) and 13b (optical element bearing face), a top cover 11 that hermetically seals the optical housing 15, a bottom cover 12, and a polygon mirror cover 10. Laser beams 14a through 14d, respectively, are optical paths corresponding to each of the photosensitive members 9a through 9d. The polygon mirrors 1a and 1b, having reflective mirrors on regular polygonal side faces, spin at high speed, and perform deflective scanning of a laser beam. The sound-damping glasses 2a and 2b dampen the noise of a motor driving the polygon mirrors 1a and 1b. The fθ lenses 3a and 3b change motion of the laser beam scanned on the photosensitive members 9a through 9d by the polygon mirrors 1a and 1b from equiangular motion to uniform linear motion. The first mirrors 4a through 4d, the second mirrors 6a through 6d, and the third mirrors 7a through 7d guide the laser beam towards the photosensitive members 9a through 9d. The long lenses 5a through 5d compensate for the slant of the sides of the polygon mirrors 1a and 1b. The dust protection glasses 8a through 8d protect the optical housing 15 against dust.

Figure 2:
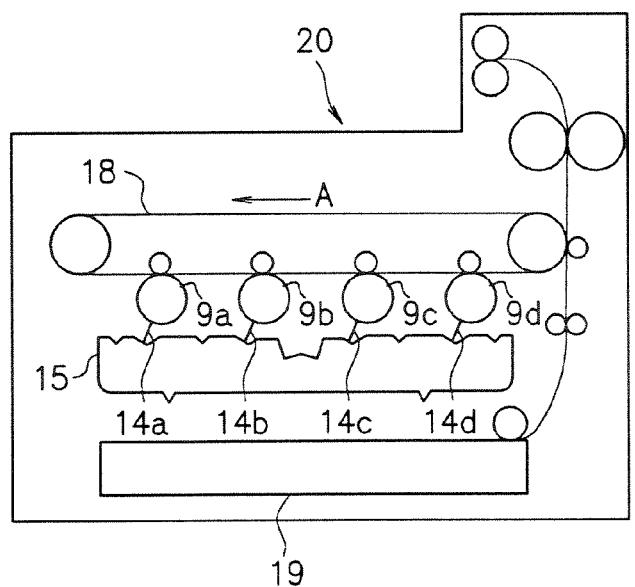
FIG. 2 is a schematic of a digital color image forming apparatus.

FIG. 2 is a schematic of a digital color image forming apparatus 20 according to the present invention. The digital color image forming apparatus 20 includes the optical housing 15, the laser beams 14a through 14d that actually perform scanning, the photosensitive members 9a through 9d on which images are formed, an intermediate transfer belt 18, and a paper feeding cassette 19. An arrow A in FIG. 2 indicates the direction in which the intermediate transfer belt 18 is driven.

Figure 3A:
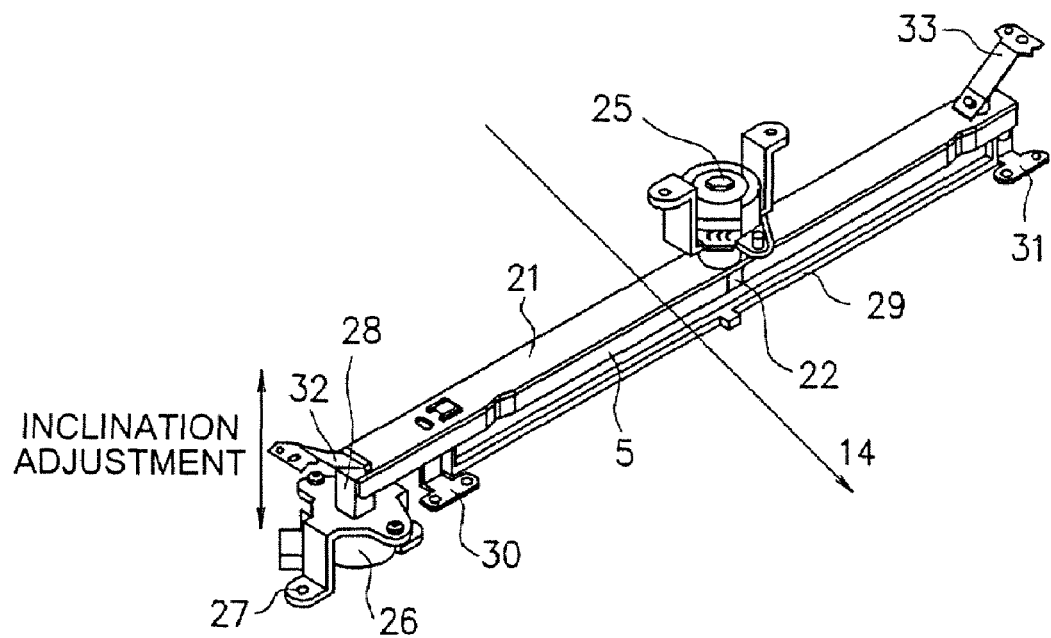
FIG. 3A and FIG. 3B are oblique perspectives of a scanning line curvature/inclination adjusting mechanism.
Figure 3B:
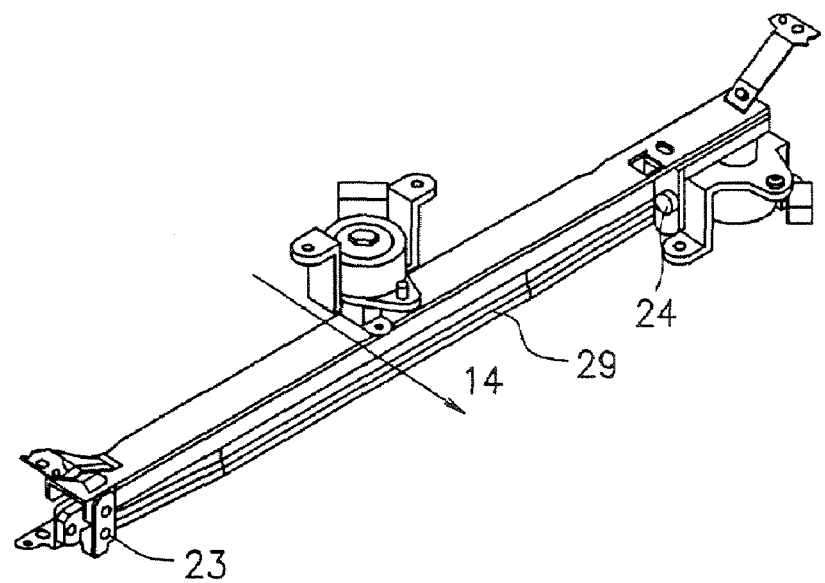
Figure 4:
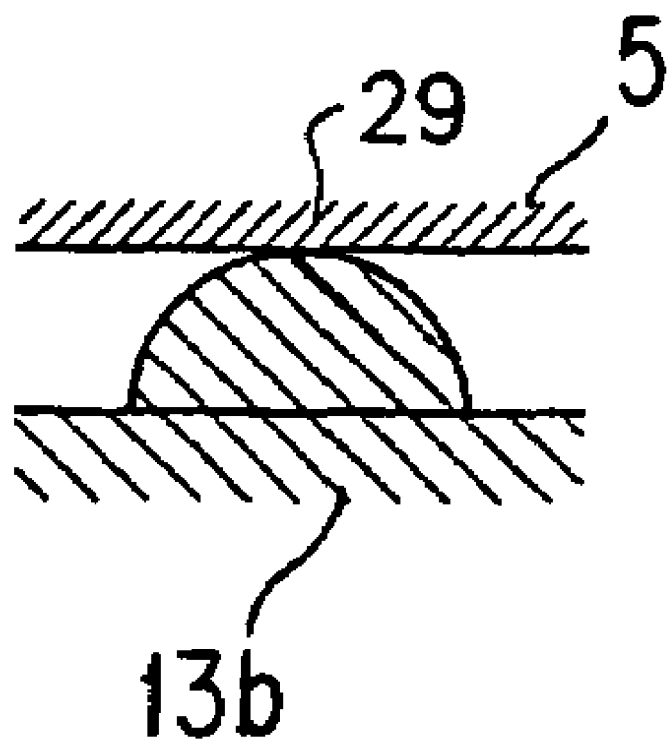
FIG. 4 is a cross-sectional view of the scanning line curvature/inclination adjusting mechanism.
Figure 5A:
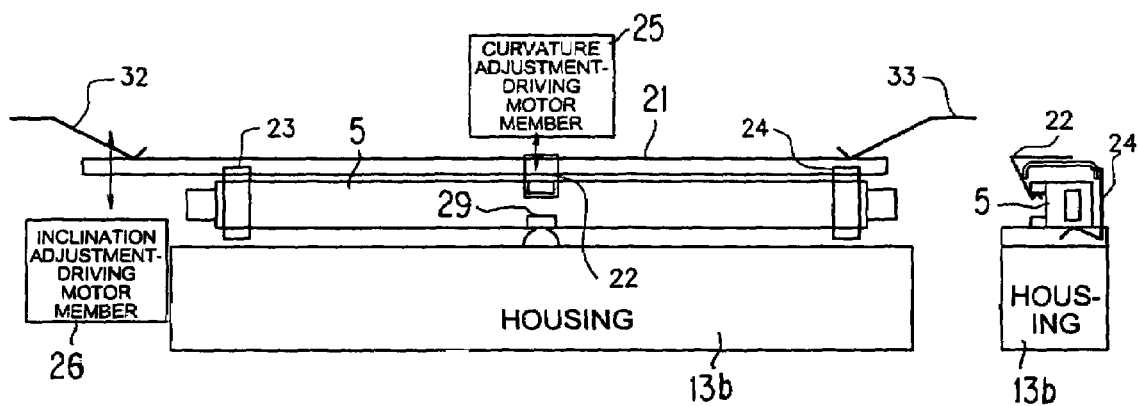
FIG. 5A and FIG. 5B are elevation views of the scanning line curvature/inclination adjusting mechanism.
Figure 5B:
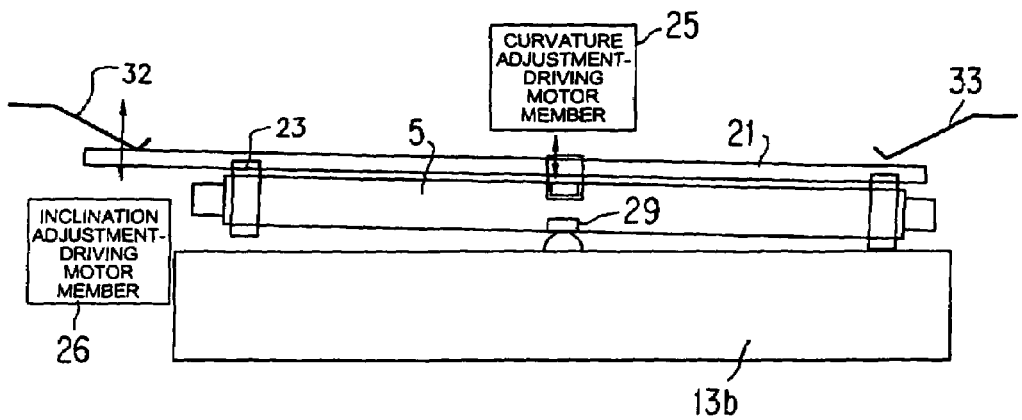
Figure 6:
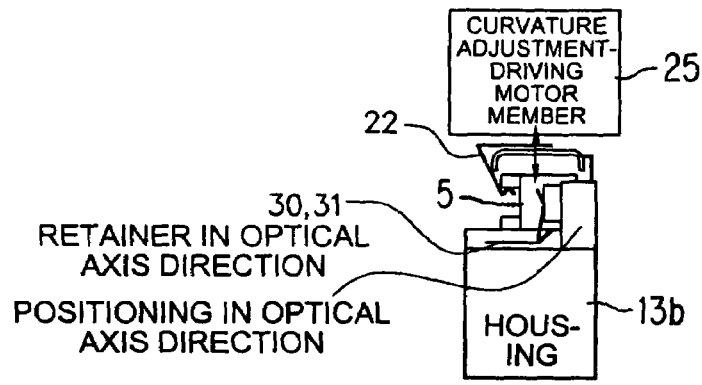
FIG. 6 is a side view of the scanning line curvature/inclination adjusting mechanism.

A mechanism for adjusting the curvature/inclination of a scanning line is explained next, with reference to FIG. 3A, FIG. 3B, FIG. 4, FIG. 5A, FIG. 5B, and FIG. 6. FIG. 3A and FIG. 3B are oblique views, FIG. 4 is a cross-sectional view, FIG. 5A and FIG. 5B are elevation views, and FIG. 6 is a side view of the scanning line curvature/inclination adjusting mechanism. The scanning line curvature/inclination adjusting mechanism includes a long lens 5 that corrects the slant of the sides of the polygon mirrors, a bracket 21 for adjusting the curvature/inclination of the scanning line, plate springs 22 through 24 for securing the long lens 5 and the bracket 21 together, a scanning line curvature adjuster 25, an automatic inclination adjuster driving motor 26, a driving motor holder 27, an adjuster 28, an optical housing receiving surface 29, and plate springs 30 through 33 that secure the long lens 5.

The automatic inclination adjuster driving motor 26 and the scanning line curvature adjuster 25 are each housed in respective driving motor holders so that their actuating units are more rigid than their respective driving motor holders.

The optical element (the long lens 5) that has the power of correcting the scanning line in the sub-scanning direction, and the bracket 21, which is composed of a material more rigid than the long lens 5, are secured together by the plate springs 22 through 24.

Figure 7:
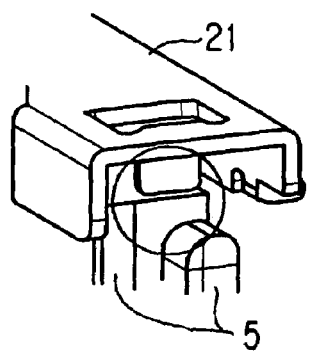
FIG. 7 is an oblique perspective of a bracket.
Figure 8:
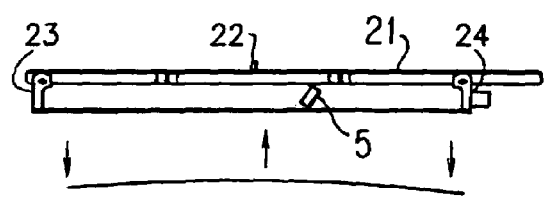
FIG. 8 is a schematic of an action that occurs when a long lens is secured to the bracket.
Figure 9:
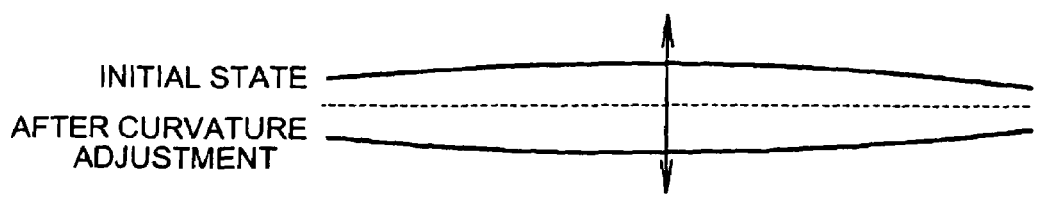
FIG. 9 is a schematic of a scanning line inclination performed by a scanning line curvature adjuster.

A long lens receiving surface is provided on the bracket 21 (see FIG. 7). The long lens 5 is secured so fast to the bracket 21 by a middle plate spring 22 as to cause the long lens 5 to flex (see FIG. 8).

Assuming the flexed state of the long lens 5 as the initial state, if an adjusting screw of the scanning line curvature adjuster 25 is driven into the long lens 5 towards an optical housing surface 13 on which the long lens 5 is placed, the long lens 5 gradually flexes in a direction opposite to the initial state. Curvature adjustment performed at this stage results in inclination of the scanning line. This mechanism is explained next.

Figure 10A:
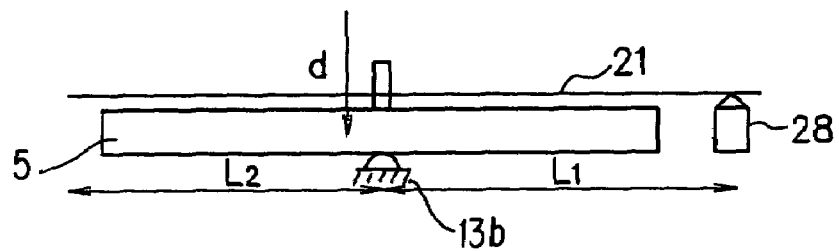
FIG. 10A, FIG. 10B, and FIG. 10C are schematics of a mechanism by which the scanning line inclination is performed by the scanning line curvature adjuster.
Figure 10B:
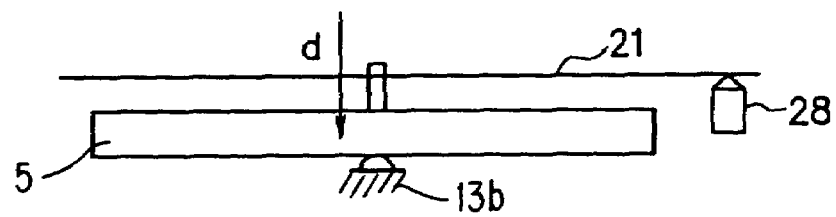
Figure 10C:
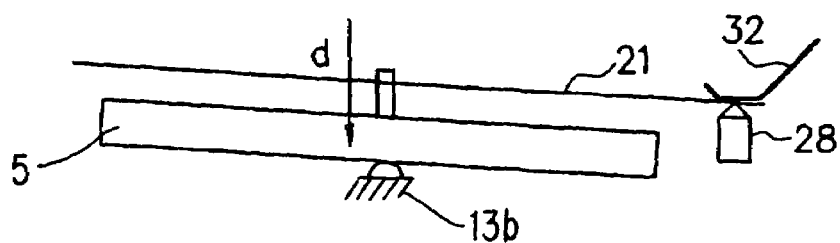
Figure 11:
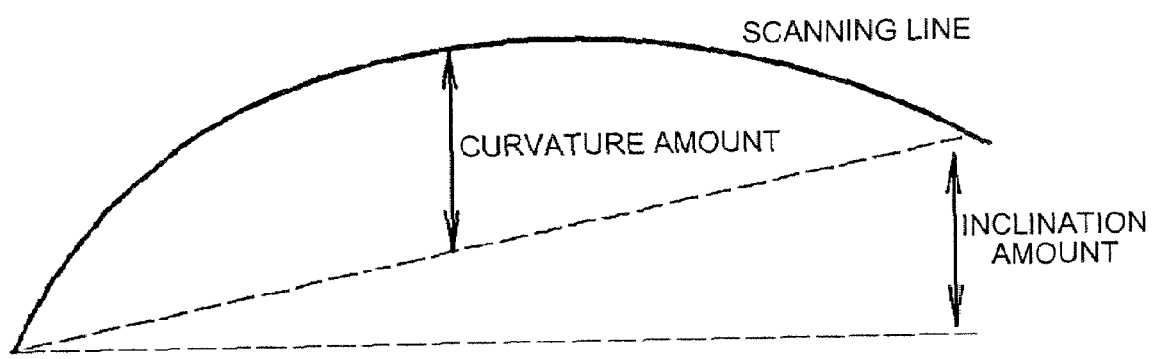
FIG. 11 is a schematic of a scanning line curvature adjustment amount.

When the scanning line curvature adjuster 25 operates, the absolute position of the bracket 21, which functions as a correcting mechanism, shifts in Z-axis by an amount of operation 'd' of the scanning line curvature adjuster 25 because the mid part of the long lens 5 is set in the housing 15 (see FIG. 10A). The position of the bracket 21 in Z-axis on the side of the inclination adjuster 26-28 does not change because the bracket 21 is pressed by the plate spring 32 towards an inclination adjuster 26-28 (see FIG. 10B), which includes the automatic inclination adjuster driving motor 26, the driving motor holder 27, and the adjuster 28. Thus, the end of the bracket 21 opposite to the end on the side of the inclination adjuster 26-28 moves in a direction opposite to that of the curvature adjustment direction (see FIG. 10C).

An adjustment amount Y of the automatic inclination adjuster driving motor 26 is calculated by the expression given below.

$$Y=(L1+L2).X/L1$$

where X is an amount of operation of the scanning line curvature adjuster 25, L1 is a distance from a setting position of the long lens 5 in the housing 15 up to the point the inclination adjuster has the bracket 21 over it, and L2 is a distance of the bracket 21 from the setting position of the long lens 5 in the housing 15 up to end of the bracket 21 opposite to that of the inclination adjuster.

Thus, by adjusting the curvature of the scanning line as described above, the change in the amount of inclination adjustment can be eliminated.

Thus, curvature adjustment of the scanning line can be automatically performed. Consequently, imposition can be automated, colors during scanning are merged, and the duration required for color merging adjustment can be shortened.

According to the present invention, degradation of optical characteristics that may be caused by placement error, etc., of the optical element reduce, and curvature and inclination adjustments are performed automatically.

Moreover, imposition is automated, colors during scanning are merged, and the duration required for color merging adjustment is shortened.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus, comprising:
an optical housing having a surface bearing an optical element having power to predominantly correct a position of a scanning line by scanning in a sub-scanning direction;
a scanning line curvature adjusting unit that adjusts a curvature of the scanning line by deforming the optical element in the sub-scanning direction, and the scanning line curvature adjustment unit is provided substantially in a center of the optical element;
a scanning line inclination adjusting unit that adjusts an inclination of the scanning line by rotating the optical element about an axis that is at right angles to a main scanning direction and the sub-scanning direction; and
a first actuating unit provided in the scanning line curvature adjusting unit, and a second actuating unit provided in the scanning line inclination adjusting unit, the first actuating unit and the second actuating unit being auto-driven, and the second actuating unit is configured to adjust a scanning line inclination amount; wherein
the optical element is directly borne on the surface,
the scanning line curvature adjusting unit is provided such that the scanning line curvature adjusting unit can be driven into the optical element towards the surface, and
a driving amount Y of the second actuating unit is calculated by $Y=(L1+L2)\cdot X/L1$, where X is a scanning line curvature in micrometers (μm), L1 is a distance from the scanning line curvature adjusting unit up to the scanning line inclination adjusting unit, and L2 is a distance from the scanning line curvature adjusting unit up to an end opposite to the scanning line inclination adjusting unit.

2. The optical scanning apparatus according to claim 1, further comprising:
a bracket secured to the optical element, and the scanning line inclination adjusting unit being configured to move the bracket for adjusting a curvature and an inclination of the scanning line.

3. The optical scanning apparatus according to claim 1, wherein
the scanning line inclination adjusting unit and the scanning line curvature adjustment unit are each housed in a chassis and the actuating units are more rigid than their respective chassis.

4. The optical scanning apparatus according to claim 1, wherein
the scanning line inclination adjustment unit and the scanning line curvature adjusting unit operate simultaneously.

5. The optical scanning apparatus according to claim 1, wherein
the optical housing is provided with N optical paths,
a number of the scanning line curvature adjusting units in each optical path is any one of N and (N−1), and
a number of the scanning line inclination adjusting units in each optical path is any one of N and (N−1).

6. An image forming apparatus of any one of a single-drum type and a tandem color type, comprising:
an optical scanning apparatus including
an optical housing having a surface bearing an optical element having power to predominantly correct a position of a scanning line by scanning in a sub-scanning direction;
a scanning line curvature adjusting unit that adjusts a curvature of the scanning line by deforming the optical element in the sub-scanning direction, and the scanning line curvature adjustment unit is provided substantially in a center of the optical element;
a scanning line inclination adjusting unit that adjusts an inclination of the scanning line by rotating the optical element about an axis that is at right angles to a main scanning direction and the sub-scanning direction; and
a first actuating unit provided in the scanning line curvature adjusting unit, and a second actuating unit provided in the scanning line inclination adjusting unit, the first actuating unit and the second actuating unit being auto-driven, and the second actuating unit is configured to adjust a scanning line inclination amount; wherein
the optical element is directly borne on the surface, and
the scanning line curvature adjusting unit is provided such that the scanning line curvature adjusting unit can be driven into the optical element towards the surface, and
a driving amount Y of the second actuating unit is calculated by $Y=(L1+L2)\cdot X/L1$, where X is a scanning line curvature in micrometers (μm), L1 is a distance from the scanning line curvature adjusting unit up to the scanning line inclination adjusting unit, and L2 is a distance from the scanning line curvature adjusting unit up to an end opposite to the scanning line inclination adjusting unit.

* * * * *